(12) United States Patent
Gryaznov et al.

(10) Patent No.: US 7,210,041 B1
(45) Date of Patent: Apr. 24, 2007

(54) SYSTEM AND METHOD FOR IDENTIFYING A MACRO VIRUS FAMILY USING A MACRO VIRUS DEFINITIONS DATABASE

(75) Inventors: Dmitry O. Gryaznov, Portland, OR (US); Viatcheslav Peternev, Bucks (GB); Igor Muttik, Herts (GB)

(73) Assignee: McAfee, Inc., Santa Clara, CA (US)

( * ) Notice: Subject to any disclaimer, the term of this patent is extended or adjusted under 35 U.S.C. 154(b) by 738 days.

(21) Appl. No.: 09/846,103

(22) Filed: Apr. 30, 2001

(51) Int. Cl.
*G06F 11/00* (2006.01)
*G06F 17/30* (2006.01)

(52) U.S. Cl. .................. 713/188; 714/38; 395/182; 395/183

(58) Field of Classification Search ............... 713/200, 713/201; 395/183, 575
See application file for complete search history.

(56) References Cited

U.S. PATENT DOCUMENTS

| | | | | |
|---|---|---|---|---|
| 5,414,833 A | * | 5/1995 | Hershey et al. | 713/201 |
| 5,448,668 A | * | 9/1995 | Perelson et al. | 714/21 |
| 5,452,442 A | * | 9/1995 | Kephart | 714/38 |
| 5,485,575 A | * | 1/1996 | Chess et al. | 714/38 |
| 5,951,698 A | * | 9/1999 | Chen et al. | 714/38 |
| 5,960,170 A | * | 9/1999 | Chen et al. | 714/38 |
| 6,016,546 A | * | 1/2000 | Kephart et al. | 713/200 |
| 6,067,410 A | * | 5/2000 | Nachenberg | 703/28 |
| 6,577,920 B1 | * | 6/2003 | Hypponen et al. | 700/200 |
| 6,647,400 B1 | * | 11/2003 | Moran | 707/205 |
| 6,721,721 B1 | * | 4/2004 | Bates et al. | 707/1 |
| 6,748,534 B1 | * | 6/2004 | Gryaznov et al. | 713/188 |
| 6,892,303 B2 | * | 5/2005 | Le Pennec et al. | 713/188 |
| 6,963,978 B1 | * | 11/2005 | Muttik et al. | 713/188 |
| 7,093,135 B1 | * | 8/2006 | Radatti et al. | 713/188 |

OTHER PUBLICATIONS

Office Action Summary from U.S. Appl. No. 09/579,810 which was mailed on Feb. 25, 2005.

* cited by examiner

*Primary Examiner*—Nasser Moazzami
*Assistant Examiner*—Carl Colin
(74) *Attorney, Agent, or Firm*—Zilka-Kotab, PC; Christopher J. Hamaty

(57) ABSTRACT

A macro virus definitions database is maintained and includes a set of indices and associated macro virus definition data files. One or more of the macro virus definition data files are referenced by the associated index. Each macro virus definition data file defines macro virus attributes for known macro viruses. The sets of the indices and the macro virus definition data files are organized according to macro virus families. One or more strings stored in a suspect file are compared to the macro virus attributes defined in the one or more macro virus definition data files for each macro virus family in the macro virus definitions database. The macro virus family to which the suspect file belongs is determined from the indices for each of the macro virus definition data files at least partially containing the suspect file.

16 Claims, 21 Drawing Sheets

```
typedef  struct  tagParseInfo{
        int             FilesNum;
        TStrings        *Strings;
        TStrings        *Lines;
        int             StringsNum;
        int             TopString;      // index of first string in chain
        unsigned long   ReplFlags;
        int             LinesNum;
        int             TopLine;        // index of first index in chain
} TParseInfo;
```

```
typedef  struct  tagStrings{
        char            *String;
        unsigned char   Type;
        unsigned char   Use;
        int             Next;
} TStrings;
```

SYSTEM AND METHOD FOR IDENTIFYING A MACRO VIRUS FAMILY USING A MACRO VIRUS DEFINITIONS DATABASE

A portion of the disclosure of this patent document contains material which is subject to copyright protection. The copyright owner has no objection to the facsimile reproduction by anyone of the patent document or disclosure, as the patent document or disclosure appear in the Patent and Trademark Office patent file or records, but otherwise reserves all copyright rights whatsoever.

FIELD OF THE INVENTION

The present invention relates in general to macro virus identification and, in particular, to a system and a method for identifying a macro virus family using a macro virus definitions database.

BACKGROUND OF THE INVENTION

Computer viruses, or simply "viruses," continue to plague unsuspecting users worldwide with malicious and often destructive results. Computer viruses propagate through infected files or objects and are often disguised as application programs or are embedded in library functions, macro scripts, electronic mail (email) attachments, applets, and even within hypertext links. Typically, a user unwittingly downloads and executes the infected file, thereby triggering the virus.

By definition, a computer virus is executable program code that is self-replicating and almost universally unsanctioned. More precisely, computer viruses include any form of self-replication computer code which can be stored, disseminated, and directly or indirectly executed. The earliest computer viruses infected boot sectors and files. Over time, computer viruses evolved into numerous forms and types, including cavity, cluster, companion, direct action, encrypting, multipartite, mutating, polymorphic, overwriting, self-garbling, and stealth viruses, such as described in "McAfee.com: Virus Glossary of Terms," Networks Associates Technology, Inc., Santa Clara, Calif. (2000), the disclosure of which is incorporated by reference.

In particular, macro viruses have become increasingly popular, due in part to the ease with which these viruses can be written. Macro viruses are written in widely available macro programming languages and can be attached to document templates or electronic mail. These viruses can be easily triggered by merely opening the template or attachment, as graphically illustrated by the recent "Love Bug" and "Anna Kournikova" macro virus attacks in May 2000 and February 2001, respectively. The "Love Bug" virus was extremely devastating, saturating email systems worldwide and causing an estimated tens of millions of dollars worth of damage.

Today, there are over 53,000 known computer viruses and new viruses are being discovered daily. The process of identifying and cataloging new viruses is manual and labor intensive. Anti-virus detections companies employ full-time staffs of professionals whose only job is to analyze suspect files and objects for the presence of viruses. On average, training an anti-virus specialist can take six months or longer. These professionals are hard pressed to keep up with the constant challenge of discovering and devising solutions to new viruses.

In the prior art, few automated tools for identifying new viruses exist. On the front line, the processes employed by anti-virus experts to discover new viruses are ad hoc and primarily reactive, rather than proactive. Typically, suspect files or objects are sent to the virus detection centers by concerned users who have often already suffered some adverse side effect from a possible virus. In times past, virus detection centers had more time during which to identify and analyze viruses, and to implement patches and anti-viral measures that could be disseminated before widespread infection occurred. Today, however, viruses often travel by e-mail and other forms of electronic communication and can infect entire networks at an alarming rate. As a result, the present manual processes for detecting new viruses are woefully slow and generally incapable of responding in a timely fashion.

Similarly, existing anti-virus software fails to provide an adequate solution to protecting and defeating new viruses. These types of software are designed to pattern scan and search out those viruses already positively identified by anti-virus software vendors. Invidious writers of computer viruses constantly strive to create new forms of viruses and easily evade existing anti-virus measures.

Therefore, there is a need for an approach to automatically identifying new forms of computer viruses and, in particular, macro computer viruses. Preferably, such an approach would be capable of identifying candidate virus families when presented with a suspect string or a particular virus family when presented with a suspect file or object. Moreover, such an approach would be capable of identifying a macro virus within a range of given search parameters.

SUMMARY OF THE INVENTION

The present invention provides an automated system and method for maintaining and accessing a database of macro virus definitions. The database is organized by macro virus families, as characterized by replication method. In addition, the database stores string constants and source code text representative of and further characterizing macro families. A suspect string can be compared to the macro virus definitions maintained in the database to determine those macro virus families to which the string likely belongs. Similarly, a suspect file or object can be compared to the macro virus definitions in the database to determine the likely family to which the suspect file or object belongs. Thresholds specifying the percentage of common string constants and common text lines, as well as minimal length of sting constants, can be specified.

An embodiment of the present invention is a system and a method for identifying a macro virus family using a macro virus definitions database. A macro virus definitions database is maintained and includes a set of indices an macro virus definition data files. Each index references one or more of the macro virus definition data files. Each macro virus definition data file defines macro virus attributes for known macro viruses. The sets of the indices and the macro virus definition data files are organized according to macro virus families in each respective index and macro virus definition data file set. A suspect string is compared to the macro virus attributes defined in the one or more macro virus definition data files for each macro virus family in the macro virus definitions database. Each macro virus family to which the suspect string belongs is determined from the index for each macro virus definition data file at least partially containing the suspect string.

A further embodiment is a system and a method for identifying a macro virus family using a macro virus definitions database. A macro virus definitions database is maintained and includes a set of indices and associated macro virus definition data files. One or more of the macro virus definition data files are referenced by the associated index. Each macro virus definition data file defines macro virus attributes for known macro viruses. The sets of the indices and the macro virus definition data files are organized according to macro virus families. One or more strings stored in a suspect file are compared to the macro virus attributes defined in the one or more macro virus definition data files for each macro virus family in the macro virus definitions database. The macro virus family to which the suspect file belongs is determined from the indices for each of the macro virus definition data files at least partially containing the suspect file.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a data structure diagram showing a parse tree header.

FIG. 6 is a data structure diagram showing a strings block.

DETAILED DESCRIPTION

Figure 1:
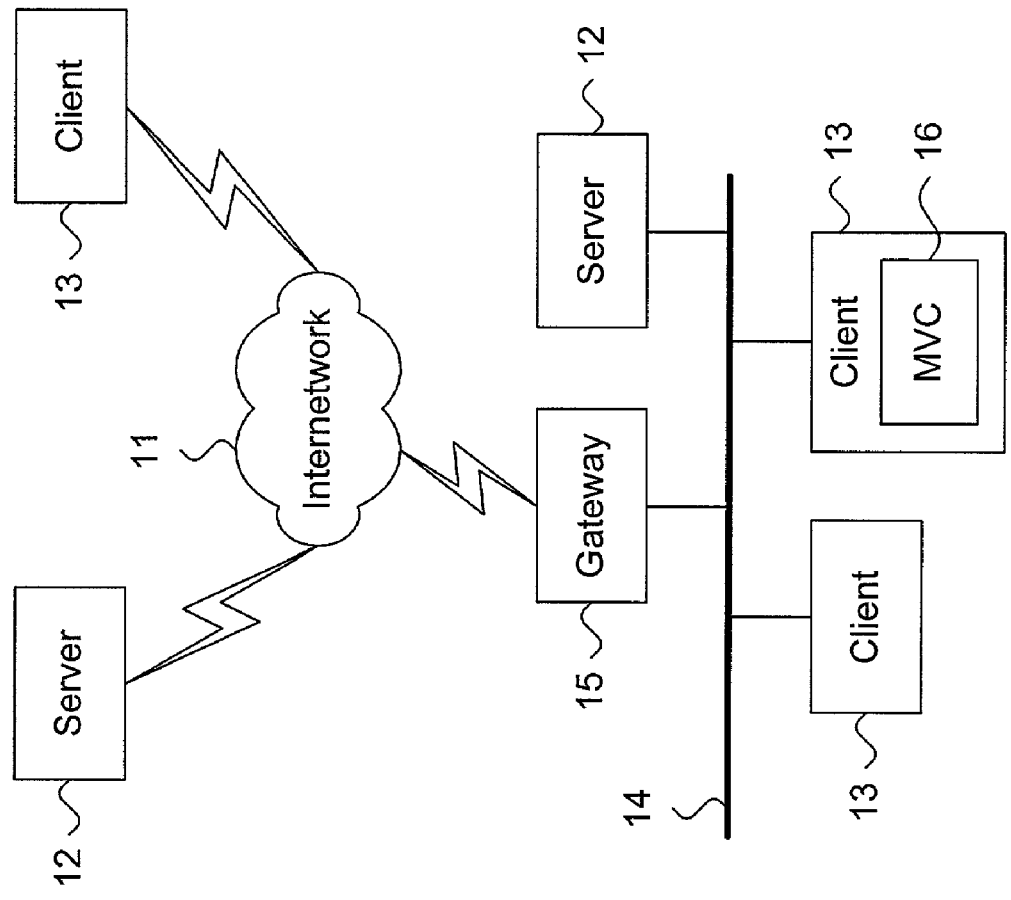
FIG. 1 is a functional block diagram of a distributed computing environment, including a system for identifying a macro virus family using a macro virus definitions database, in accordance with the present invention.

FIG. 1 is a functional block diagram showing a distributed computing environment 10, including a system for identifying a macro virus family, using a macro virus definitions database, in accordance with the present invention. The networked computing environment 10 includes one or more servers 12 interconnected to one or more clients 13 over an internetwork 11, such as the Internet. Each server 12 provides client services, such as information retrieval and file serving. Alternatively, the clients could be interconnected with the server 12 using a direct connection, over a dial-up connection, via an intranetwork 14, by way of a gateway 15, or by a combination of the foregoing or with various other network configurations and topologies, as would be recognized by one skilled in the art.

A client 13, or alternatively a server 12, implements a macro virus checker (MVC) 16 for identifying macro virus attributes using a macro virus definitions database, as further described below with reference to FIG. 2. During operation, a user can submit a suspect string to the macro virus checker 16 to identify candidate virus families to which the suspect string may belong. Alternatively, the user can submit a file or object to the macro virus checker 16 to identify a candidate virus family to which the suspect file or object belongs.

The individual computer systems, including the servers 12 and clients 13, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
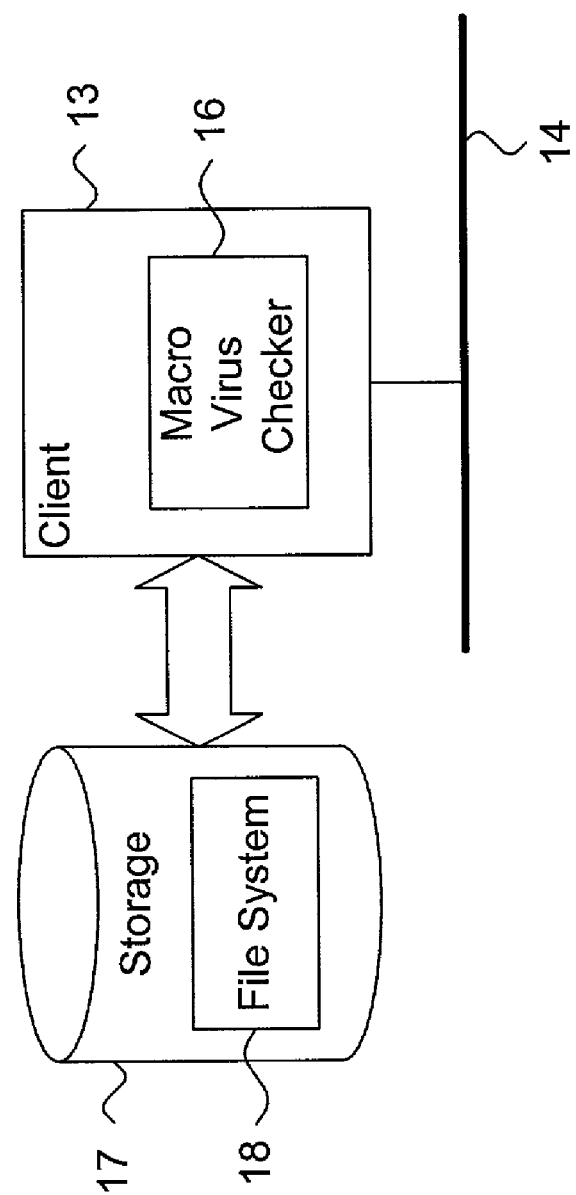
FIG. 2 is a block diagram of the system for identifying a macro virus family of FIG. 1.

FIG. 2 is a block diagram showing the system for identifying a macro virus family of FIG. 1. By way of example, the macro virus checker 16 executes on a client 13 coupled to a secondary storage device 17. The system is preferably implemented in software as a macro virus checker 16 operating on the client 13, or on the server 12 (shown in FIG. 1) or any similar general purpose programmed digital computing device. The storage device 17 includes a file system 18 within which files and related objects are persistently stored. In addition, the client 13 interfaces to other computing devices and resources via an intranetwork 14, an internetwork 11 (shown in FIG. 1), or other type of network or communications interface.

Figure 3:
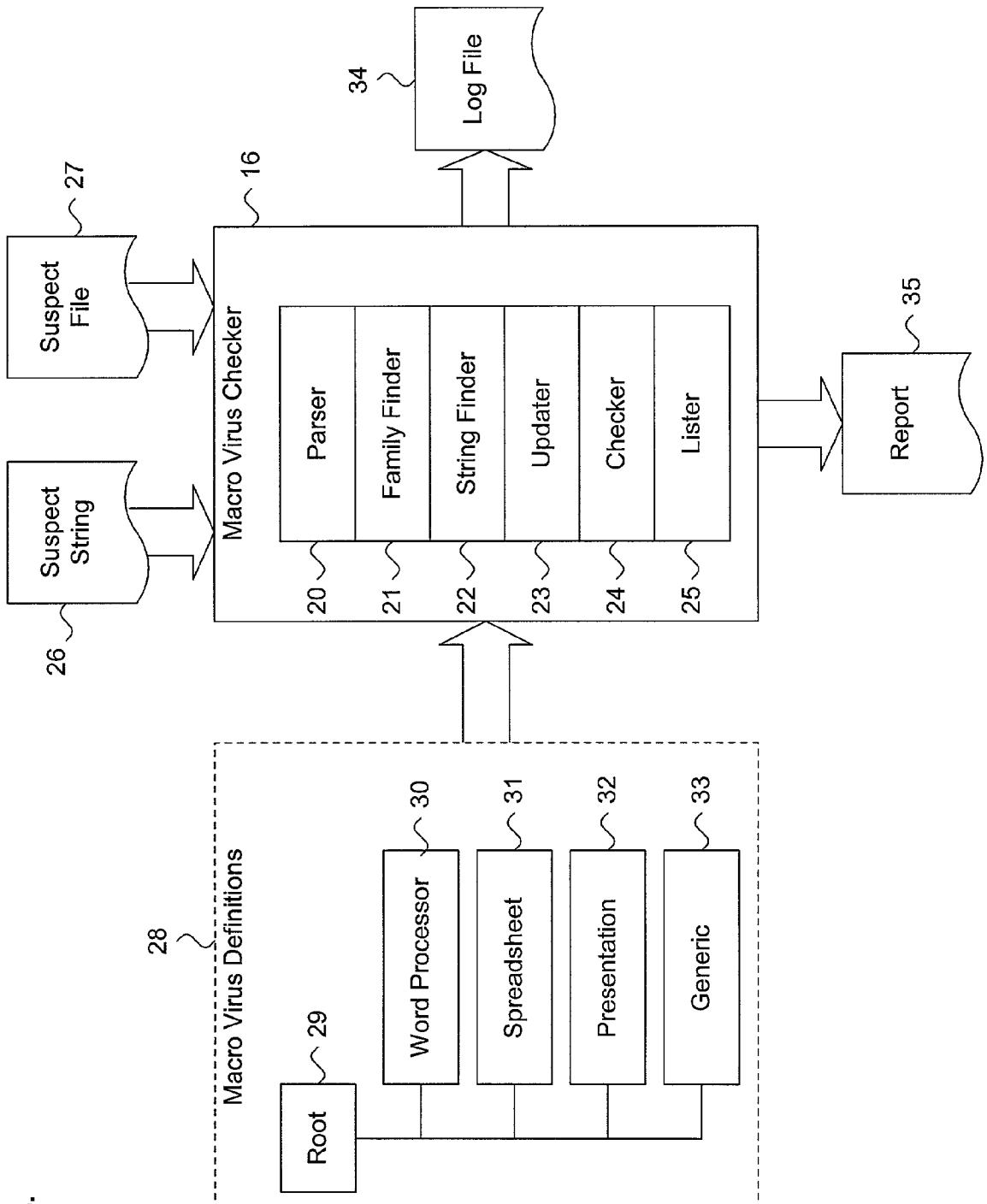
FIG. 3 is a block diagram showing the software modules implemented in the system of FIG. 1.

FIG. 3 is a block diagram showing the software modules implementing the macro virus checker 16 of the system of FIG. 1. Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The macro virus checker 16 operates in accordance with a sequence of process steps, as further described below beginning with reference to FIG. 8. The Appendix includes a source code listing for a computer program in the C++ programming language implementing the macro virus checker 16.

The macro virus checker 16 consists of six intercooperating modules: parser 20, family finder 21, string finder 22, updater 23, checker 24, and lister 25. Operationally, the macro virus checker 16 receives as an input either a suspect string 26 or a suspect file 27 or object (hereinafter simply "suspect file") for comparison to the database of macro virus definitions 28. The suspect string 26 or suspect file 27 is parsed by the parser 20 to identify individual tokens. In the described embodiment, the parser 20 removes comments and extraneous information from the suspect string 26 and suspect file 27. The parser 20 processes the suspect string 26 and suspect filed 27 on a line-by-line basis and generates a hierarchical parse tree, as is known in the art.

During analysis, a suspect string 26 or suspect file 27 (shown in FIG. 3) is parsed into individual tokens stored in a parse tree. As further described below with reference to FIG. 7, parse tree stores individual string constants and source code text as two linked lists rooted using a parse information header.

Once parsed, a number of operations can be performed on the parse tree. First, the macro virus family to which the suspect file 27 belongs can be identified using the family finder 21, as further described below with reference to FIGS. 9A–9C. Similarly, the candidate macro virus families to which the suspect string 26 belongs can be identified by the string finder 22, as further described below with reference to FIGS. 9A–9C. The macro virus definitions database 28 can be updated using the updater 23, as further described below with reference to FIGS. 10A–10B. Likewise, the macro virus definitions database 28 can be checked for cross-references using the checker 24, as further described below with reference to FIGS. 12A–12D. Finally, the file names of the macro virus definition families can be listed using the lister 25, as further described below with reference to FIGS. 13A–13B.

The macro virus definitions database 28 is hierarchically organized into macro virus families based on the type of application to which the macro applies. By way of example, the macro virus definitions database 28 can include a root directory 29, below which word processor 30, spreadsheet 31, presentation 32, and generic 33 subdirectories can contain individual indices and macro virus definition data (.dat) files, as further described below with reference to FIG. 4. The results of the operations performed by the macro virus checker 16 on the suspect string 26 or suspect file 27 are output in a report 35 and details of the analysis are provided in a log file 34.

Figure 4:
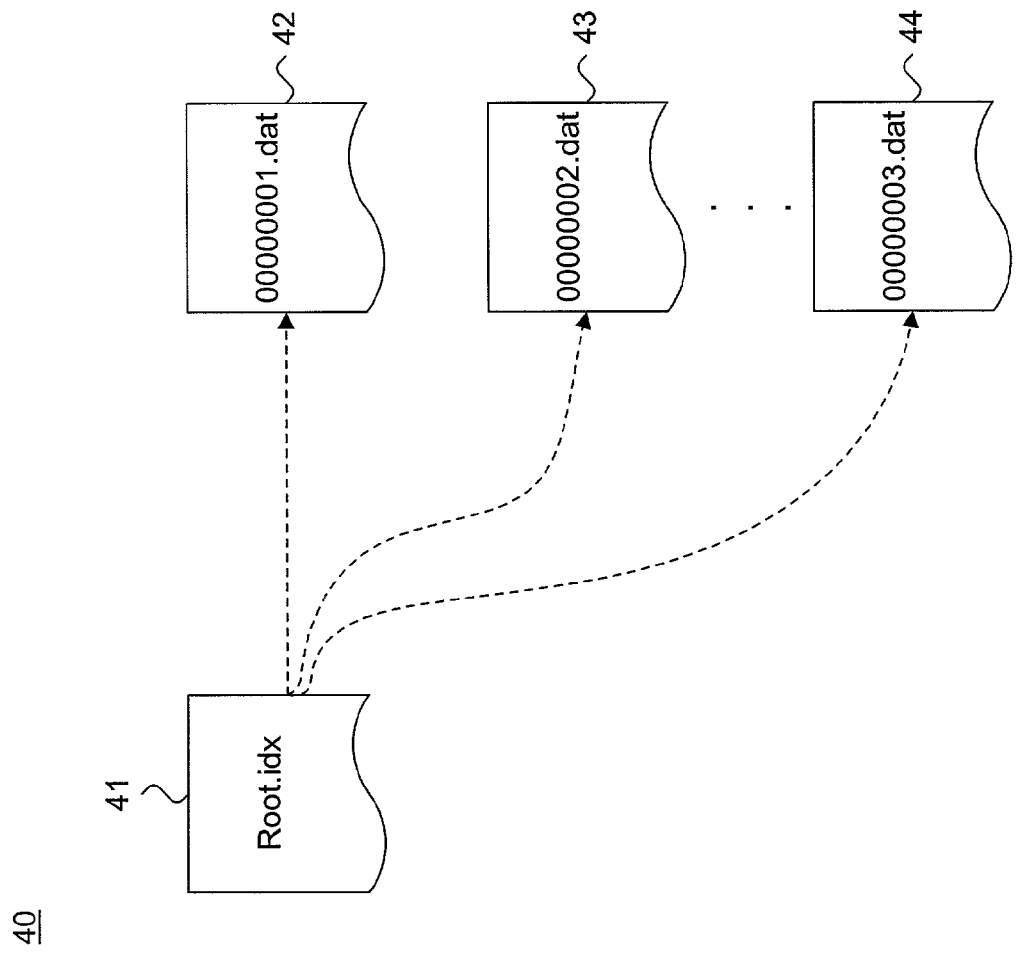
FIG. 4 is a data structure diagram showing the cataloging of macro virus definitions.

FIG. 4 is a data structure diagram 40 showing the indexing of a macro virus definitions family. An index maintained in index files, route.idx 41 stores pointers to locations in individual .dat files 000000001.dat 42, 000000002.dat 43 and 000000002.dat 44 files. Each of the .dat files 42–44 store information describing a macro virus family, as characterized by the replication method used by the virus. In the described embodiment, the replication methods include types "organizer," "macro copy," "import," "replace line," "insert lines," "add from string," and "add from file."

In addition, each .dat file contains any sting constants and lines of source code text, without comments, common to all replicants of the macro virus. The macro virus definition is assigned a name to aid in the understanding by the user. Macro viruses are further described in M. Ludwig, "The Giant Black Book of Computer Viruses," Ch. 14, American Eagle Pubs, Inc., Show Low, Ariz. ($2^{nd}$ ed. 1998), the disclosure of which is incorporated by reference.

FIG. 5 is a data structure diagram showing the structure of the header 50 TparseInfo for storing parse information. The header includes a count of the number of files FilesNUM from which the suspect file 27 originates, pointers to the string constants Strings and source code text Lines, an index to the first string for the sting constants TopString, an index to the first string for the source code text TopLine, and a count of the number of strings StringsNum and source code text LinesNum. Finally, the parse information header includes a byte flag ReplFlags storing an indication of the type of replication method used.

FIG. 6 is a data structure diagram showing the structure of each node TStrings 60 in which each of the sets of parsed tokens for the string constants and source code text are stored. The actual token is stored as a character string String along with the type and use of the string. A pointer Next points to the next node in the linked list.

Figure 7:
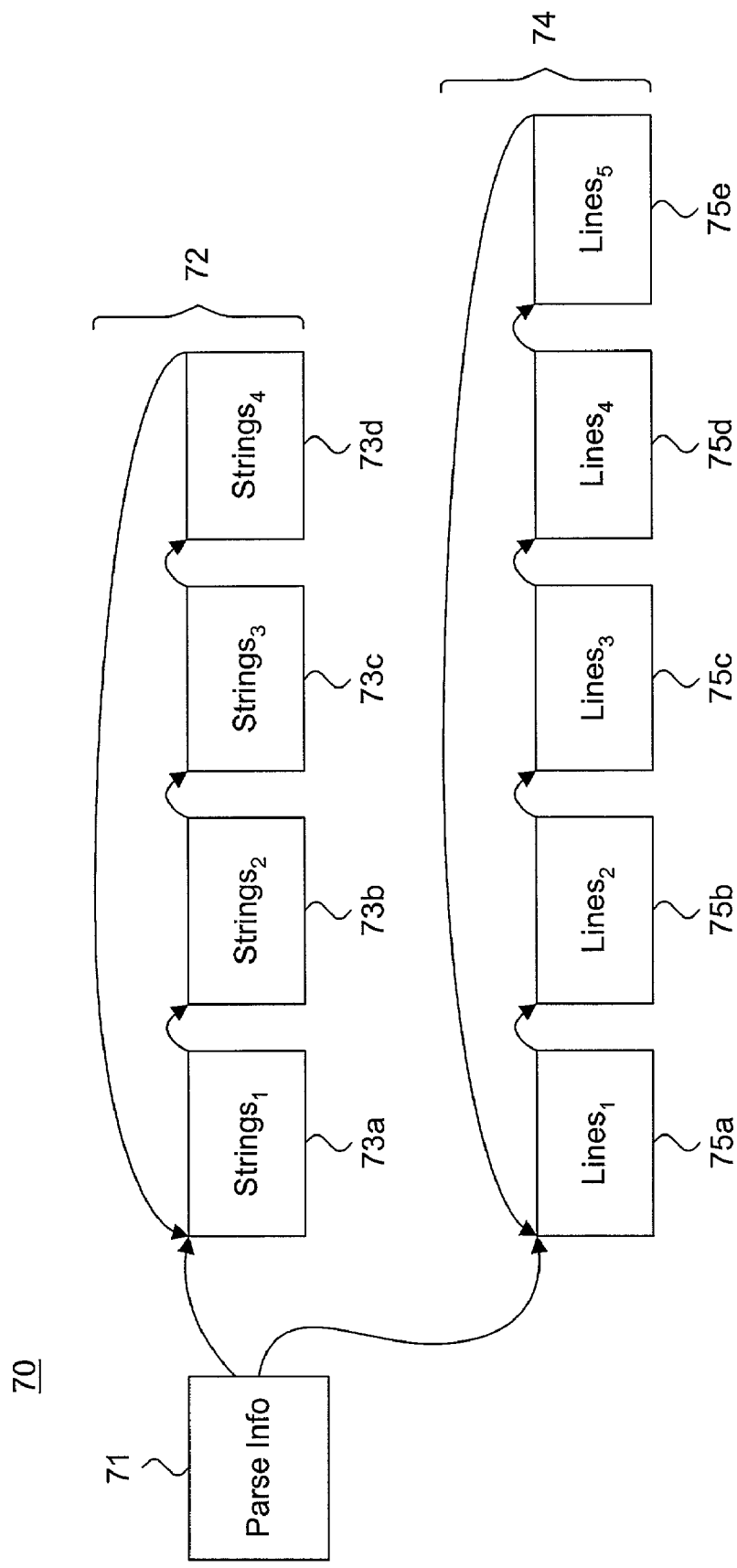
FIG. 7 is a data structure diagram showing, by way of example, a parse tree constructed using the data structures of FIGS. 5 and 6.

FIG. 7 is a data structure diagram showing, by way of example, a parse tree 70 for a suspect file 27 (shown in FIG. 3). The parse information header TParseInfo 71 points to the first node 73a–d, 75a–e in each of the respective linked lists for the main constants Strings 72 and source code text Lines 74. Each of the individual nodes in the strings linked list 72 and lines linked list 74 point to the next node in each list. The linked lists wrap back around such that each list forms a continuous chain. The first string (for string constants) or index (for source code text) in each chain is respectively identified by a counter TopString or TopLine, as further described above with reference to FIG. 5.

Figure 8:
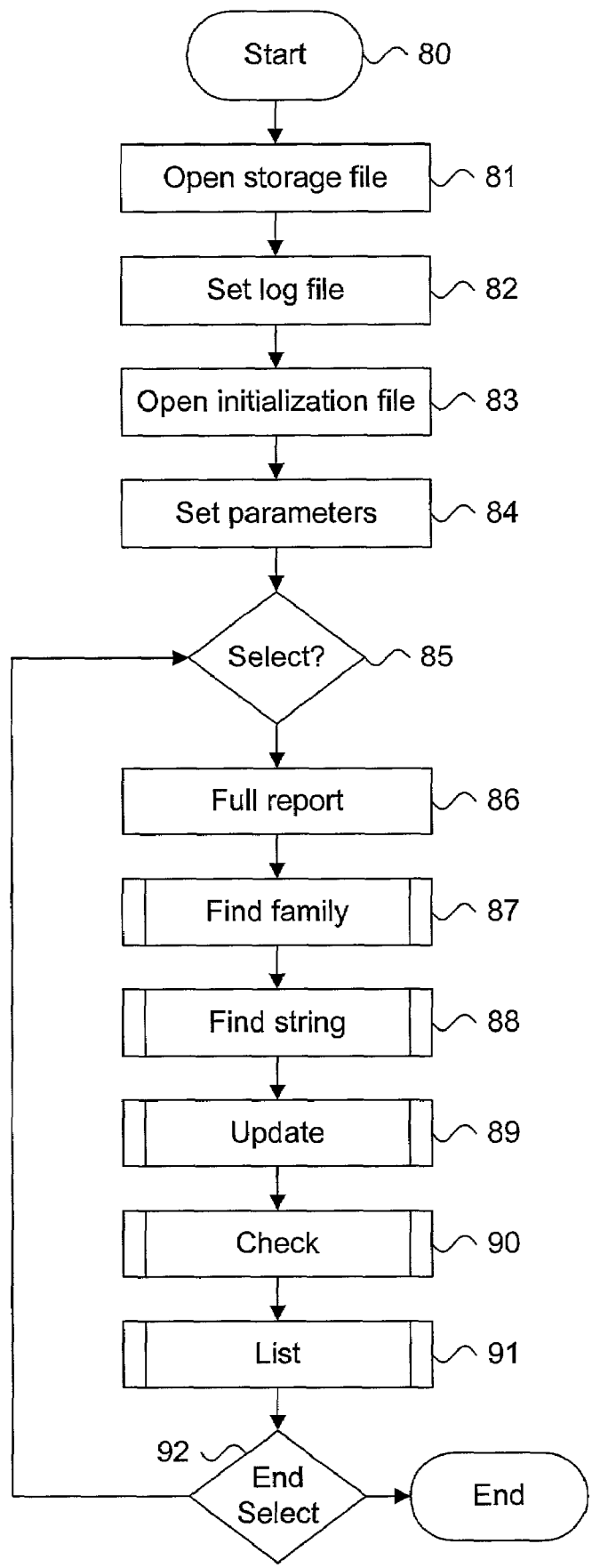
FIG. 8 is a flow diagram showing a method for identifying a macro virus family using a macro virus definitions database in accordance with the present invention.

FIG. 8 is a flow diagram showing a method 80 for identifying macro virus attributes using macro virus definitions database 28 (shown in FIG. 3) in accordance with the present invention. The method provides an environment in which the macro virus definitions database 28 can be maintained and accessed to determine macro virus attributes and family membership for a suspect string 26 or a suspect file 27.

The method 80 begins with the initialization of a working environment. First, the storage file, that is, the directory containing the macro family description datafile, is opened (block 81). Next, the log file 34 (shown in FIG. 3) is set (block 82) and the initialization file is opened (block 83). Any parameters specified by the user are set, in addition to any default parameters (block 84). Processing then begins.

The macro virus checker 16 performs several operations based on a user or automatically specified selection (blocks 85–92) as follows. First, a full report can be generated (block 86) to present the macro virus definition family stored in the macro virus definitions database 28. A macro virus family can be found for a suspect file 27 (block 87), as further described below with reference to FIGS. 9A–9C. A set of macro virus families containing a given string can be found (block 88), as further described below with reference to FIGS. 10A–10B. The macro virus definitions database 28 can be updated (block 89), as further described below with reference to FIGS. 11A–11C. Similarly, the macro virus definitions database 28 can be checked for cross-references (block 90), as further described below with reference to FIGS. 12A–12D. Finally, the macro virus definition families can be listed (block 91), as further described below with reference to FIGS. 13A–13B. The method terminates upon the completion of the various operations.

Figure 9A:
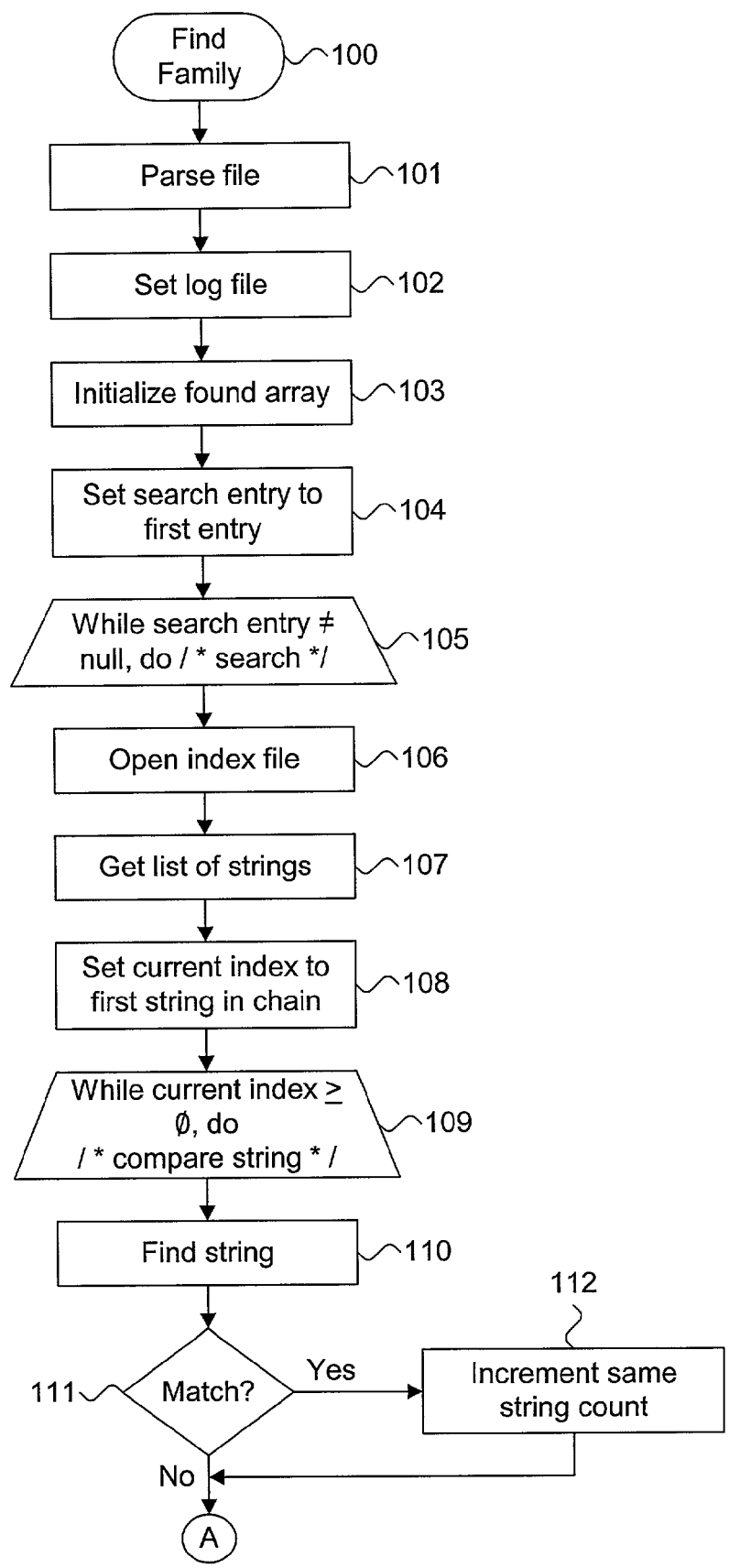
FIGS. 9A–9C are flow diagrams showing the routine for finding a macro virus family for use in the method of FIG. 8.
Figure 9B:
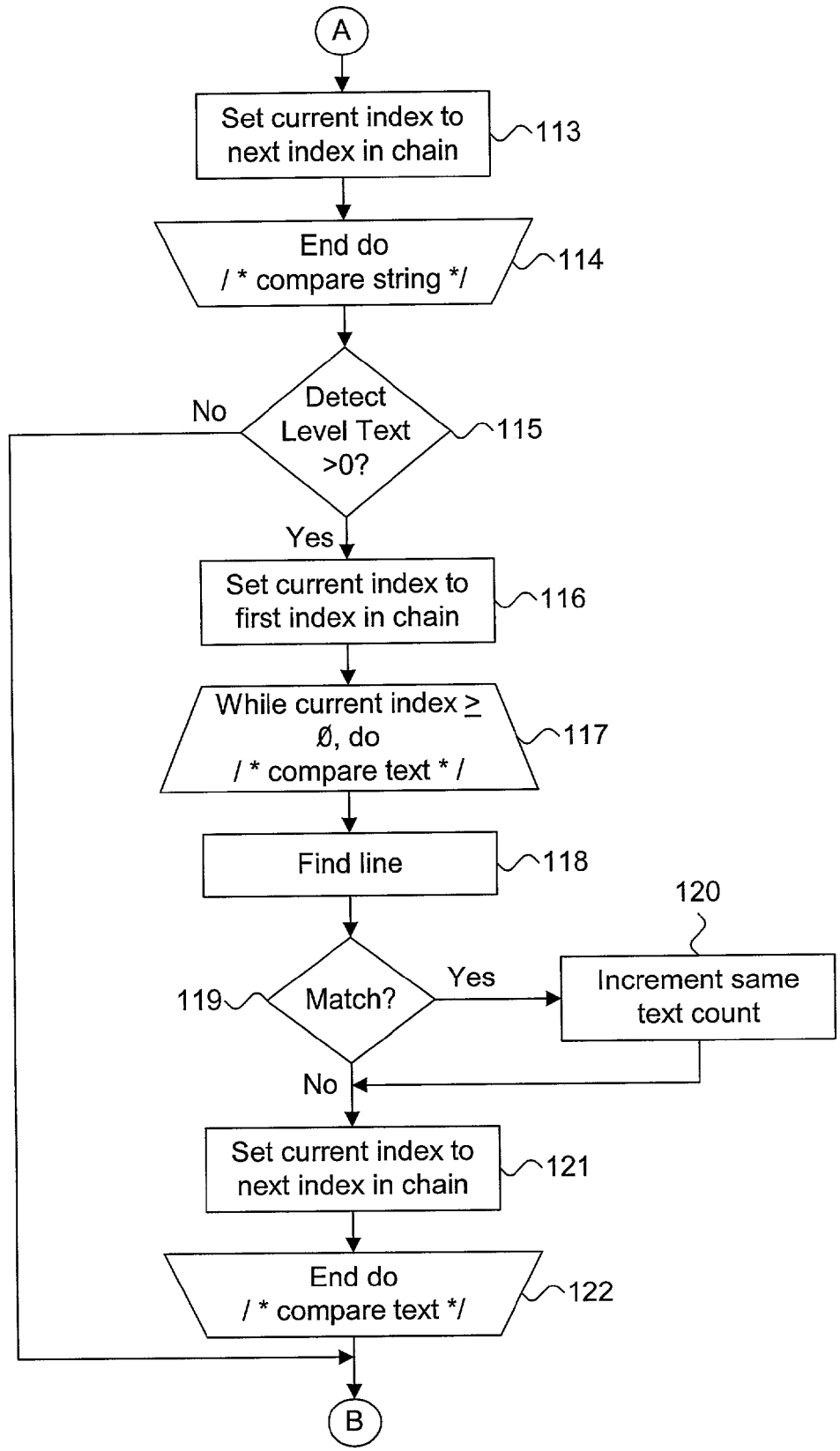
Figure 9C:
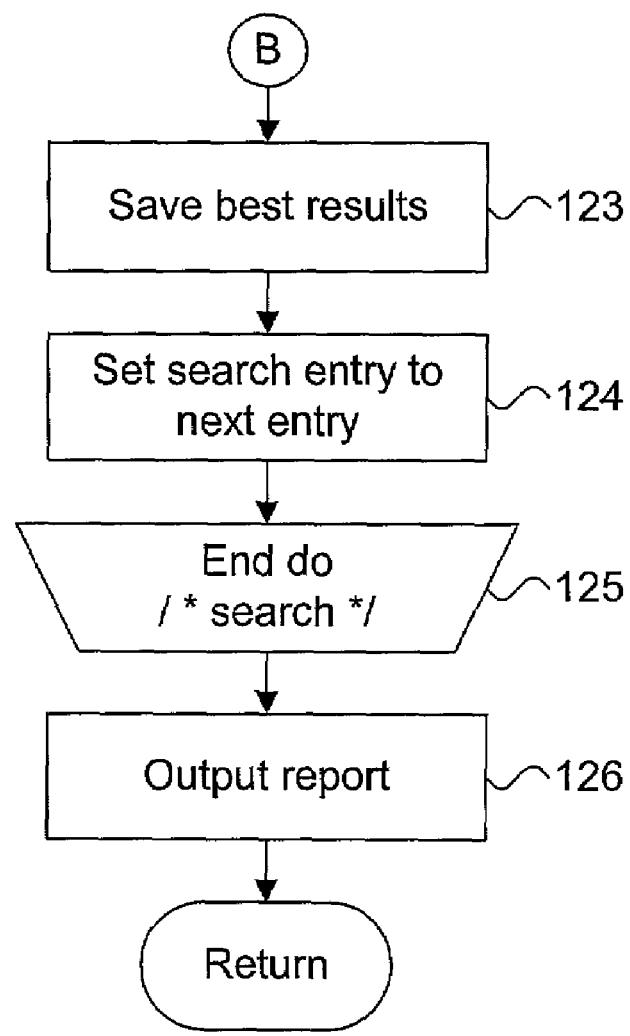

FIGS. 9A–9C are flow diagrams showing the routine for finding a macro virus family 100 for use in the method of FIG. 8. The purpose of this routine is to identify, if possible, the macro virus family to which a suspect file 27 (shown in FIG. 3) belongs. The user can specify a given confidence level representing a percentage for string constants and the matches for the replication method used. The routine will determine the closest matching macro virus family within the given search parameters.

First, the suspect file 27 is parsed (block 101) and the log file is set (block 102). A found array is initialized (block 103) within which matching common string constants and common text lines are stored. A search entry is set to the first entry in the parse tree (block 104). Each entry in the parse tree is iteratively processed (blocks 105–125), as follows. First, an index file 41 (shown in FIG. 4) is opened (block 106) and a list of strings stored therein is obtained (block 107). The list of strings is indexed by a current index pointer set to the first string in the chain (block 108). Each of the strings is then iteratively processed (blocks 109–114), as follows. First, a token from the parse tree is compared to the string for matching or partially matching a string constant (block 110). If the token matches (block 111), a same string counter is incremented (block 112). The current index is set to the next index in the chain (block 113) and processing of the current list of strings continues until the string is complete.

Next, if the detection level for source code text is greater than zero (block 115), the token is also compared to any stored source code text (blocks 116–122). Otherwise, no source code text comparisons are performed. Thus, assuming source code text is also being searched, the current index is set to the first index in the chain (block 116) and each of the nodes of source code text in the linked list are iteratively processed (blocks 117–122), as follows. A token from the parse tree is compared to the source code text (block 118). If the token matches (block 119), a same text counter is incremented (block 120). The current index is set to the next index in the chain (block 121) and iterative processing continues (block 117) unit the list of text is complete.

Next, the results of the searches for matching string constants and, if performed, source code text, are saved (block 123) and the search entry is set to the next entry in the parse tree (block 124). Each of the parse tree nodes is processed (block 125) until the parse tree is complete. Finally, a report is output (block 126) indicating the results of the search, after which the routine returns.

Figure 10A:
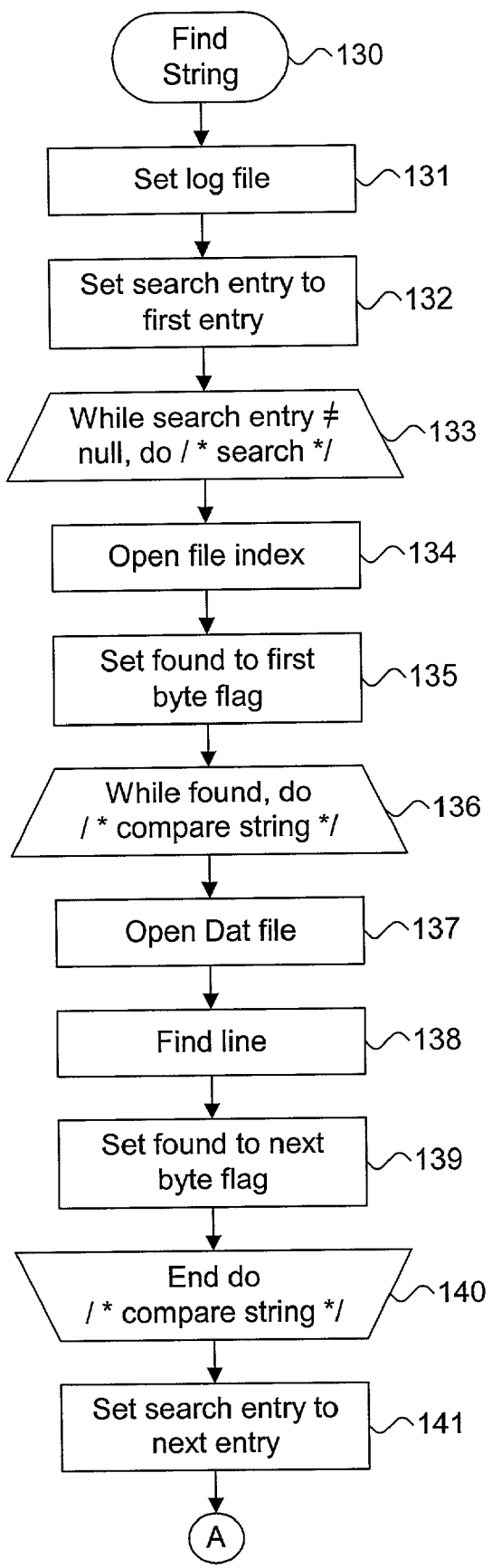
FIGS. 10A–10B are flow diagrams showing the routine for finding a string for use in the method of FIG. 8.
Figure 10B:
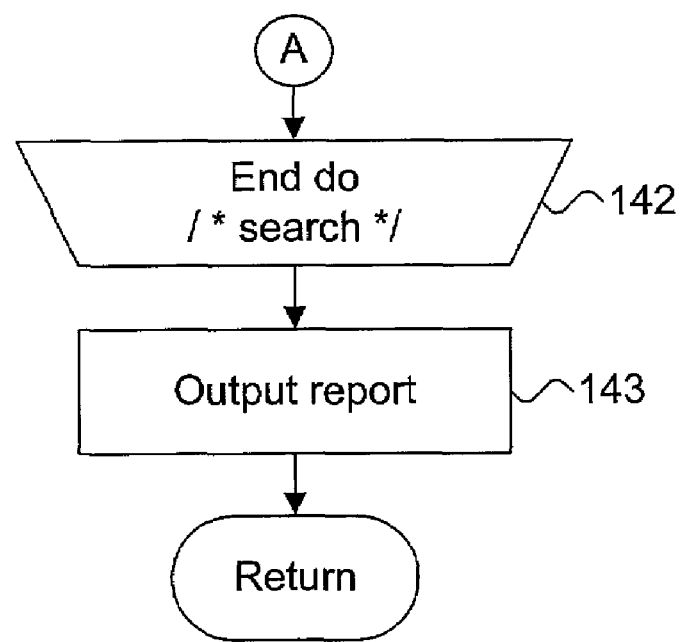

FIGS. 10A–10B are flow diagrams showing the routine for finding a string 130 for use in the method of FIG. 8. The purpose of this routine is to find those macro virus definition families in which a suspect string 26 (shown in FIG. 3) can be found. This routine functions as an adjunct to the routine for finding a macro virus definition family 100 (shown in FIGS. 9A–9C), as a suspect file 27 consists of one or more suspect strings 26 and the results of the more extensive searching performed by the find family routine 100 can narrow down the field to a single macro virus definition family.

As before, the log file 34 (shown in FIG. 3) is set (block 131) and the search entry is set to the first entry in the parse tree (block 132). The parse tree is iteratively processed (block 133–142), as follows. First, an index file 41 (shown in FIG. 4) is opened (block 134) and a found flag is set to the first replication byte flag ReplFlags (shown in FIG. 5) (block 135). Recall that the byte flag replFlag indicates the replication method used by the macro virus family. Each byte flag ReplFlags is iteratively processed (136–140), as follows.

First, the .dat file 42 (shown in FIG. 4) is opened (block 137) and each line containing the source code text identified by the current token is found (block 138). The byte flag is set to the next byte flag ReplFlags (block 139) and iterative processing continues until all of the byte flags ReplFlags are complete (block 136). The search entry is then set to the next entry in the parse tree (block 141) and iterative processing continues through the parse tree unit the parse tree is complete (block 142). Finally, a report is output (block 143), after which the routine returns.

Figure 11A:
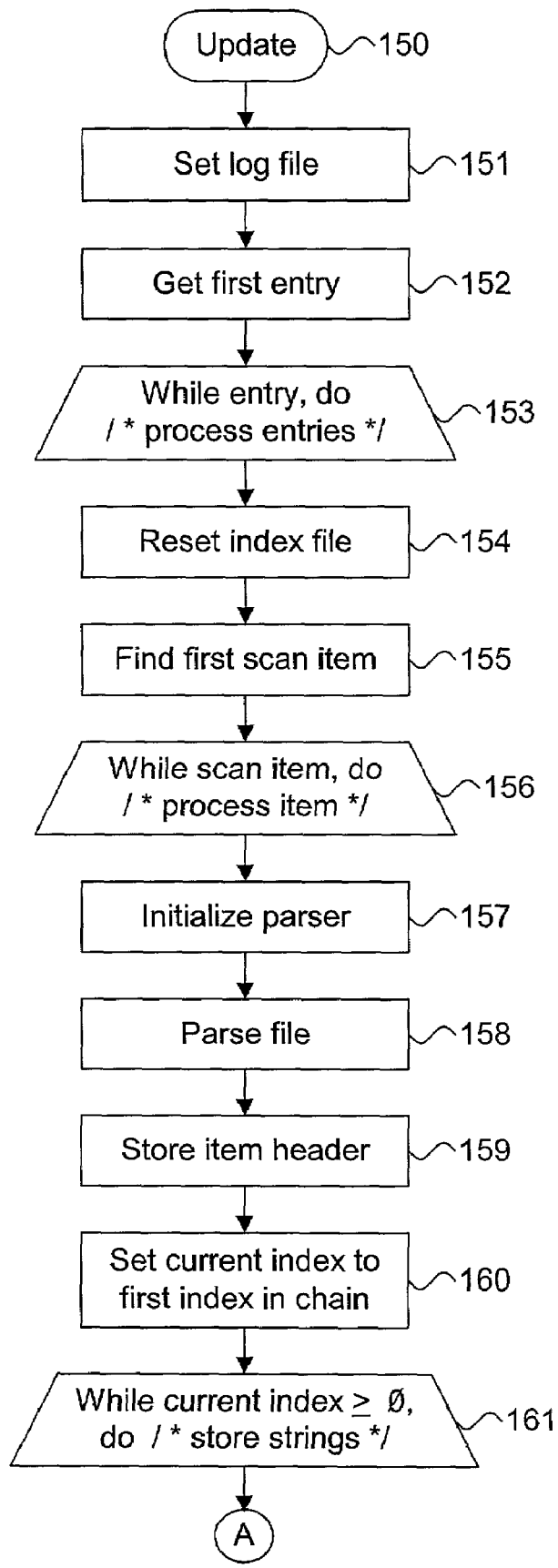
FIGS. 11A–11C are flow diagrams showing the routine for updating the virus definitions database for use in the method of FIG. 8.
Figure 11B:
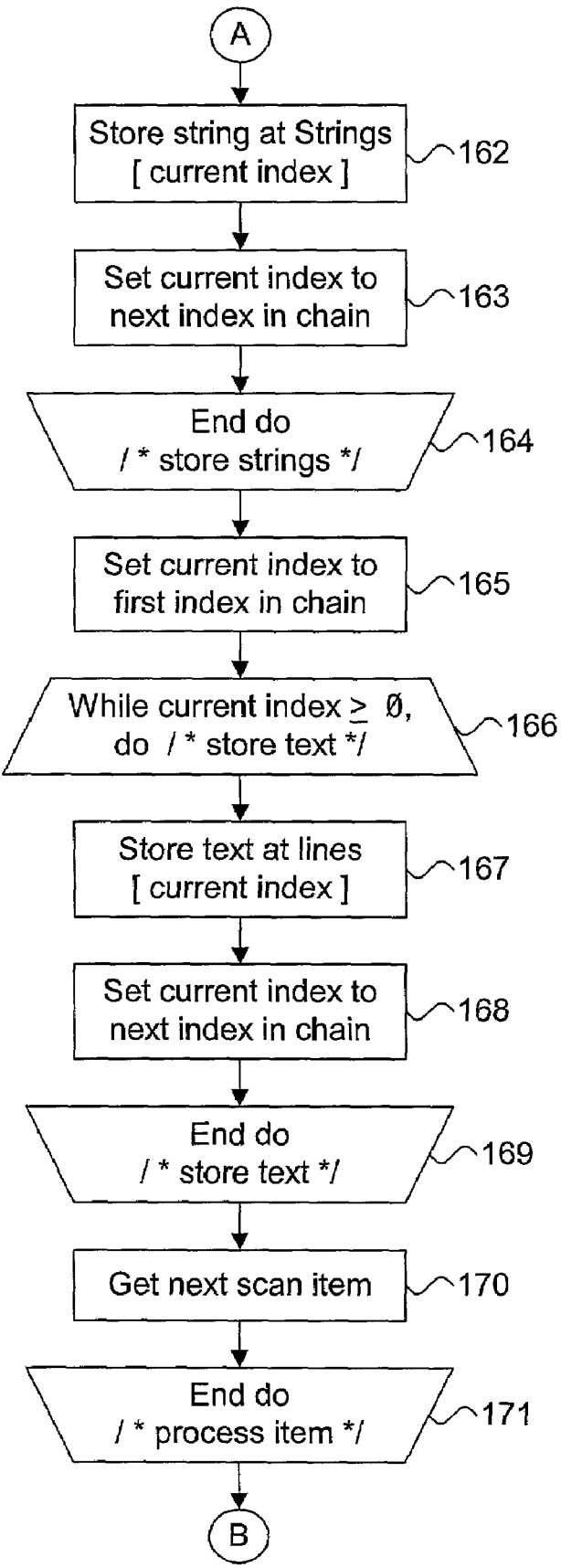
Figure 11C:
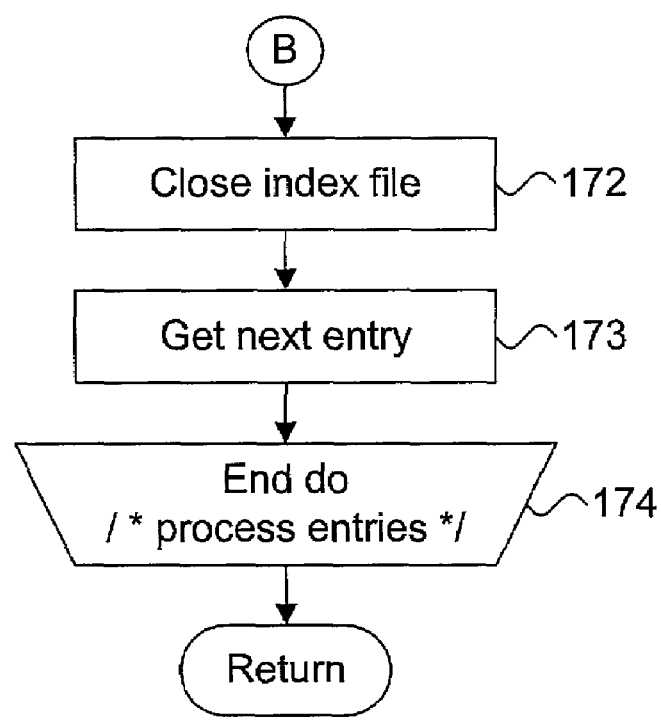
Figure 12A:
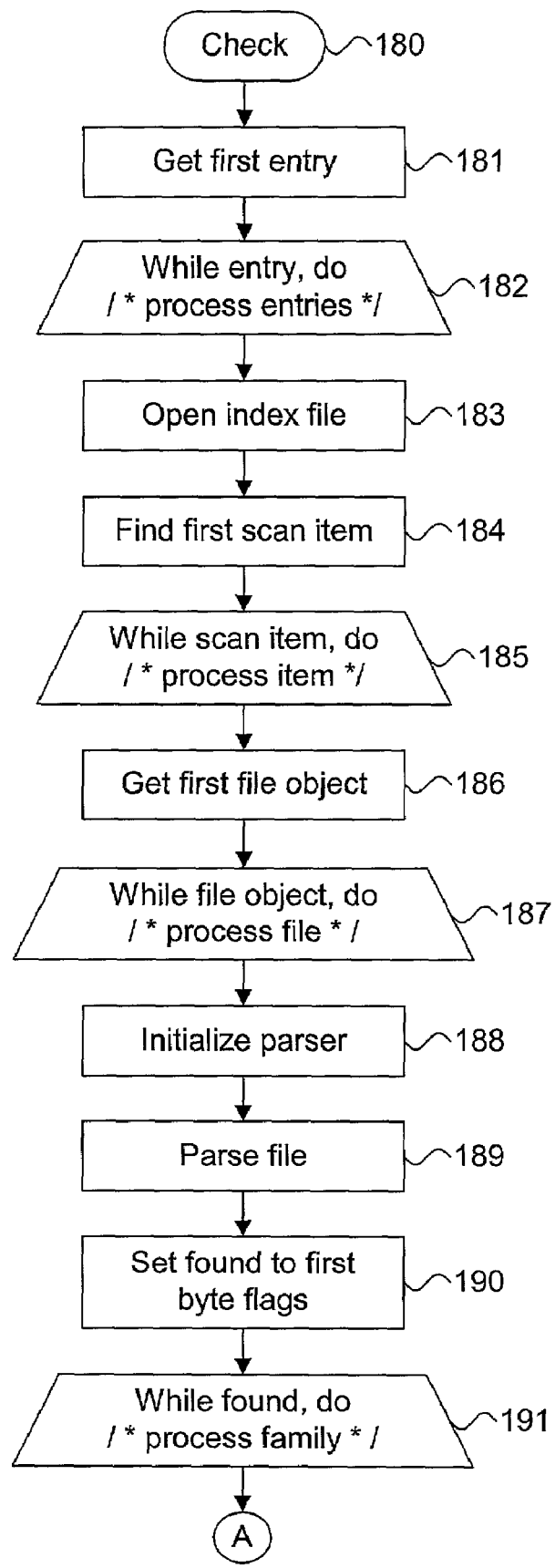
FIGS. 12A–12D are flow diagrams showing the routine for checking the virus definitions database for use in the method of FIG. 8.
Figure 12B:
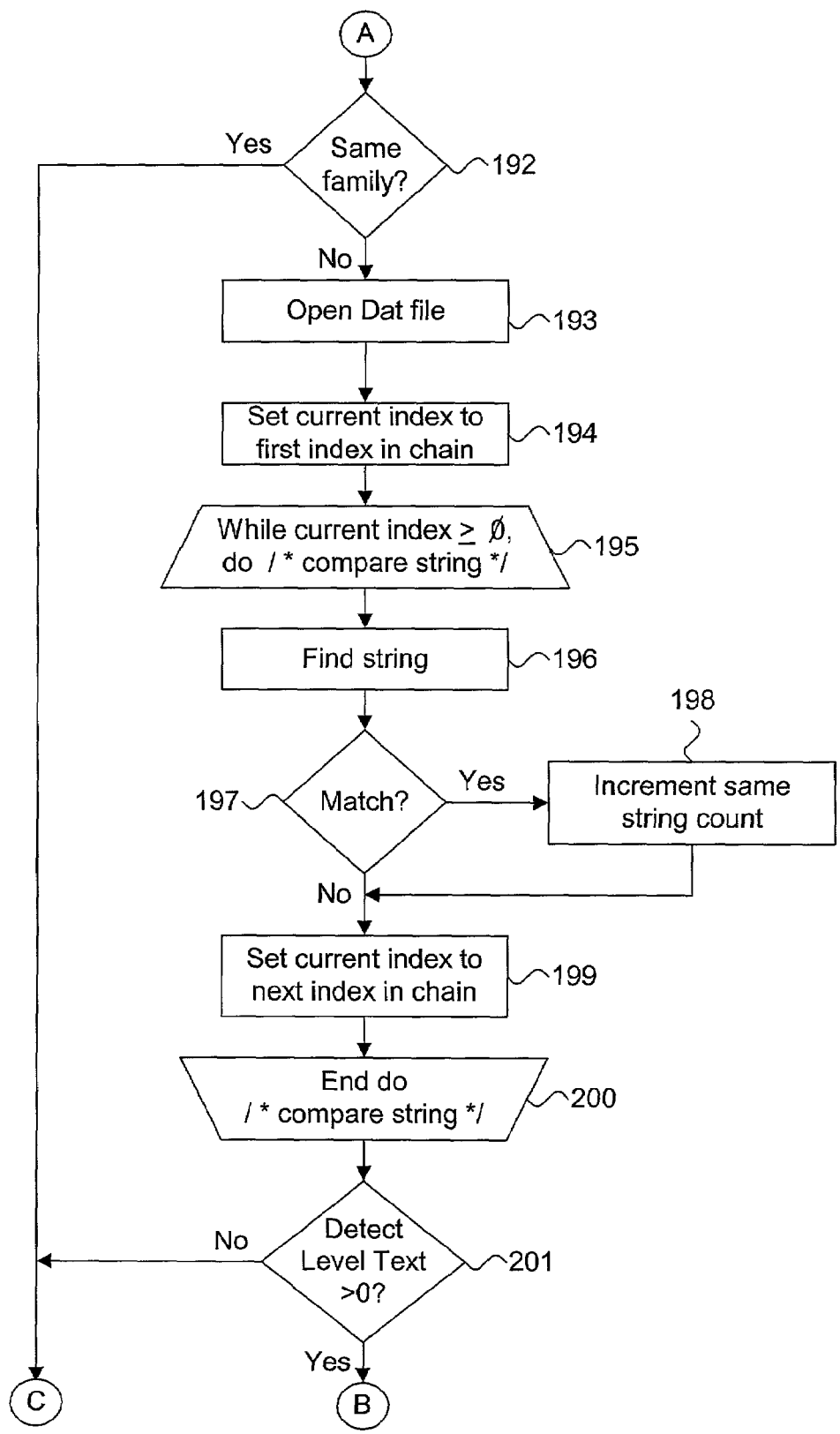
Figure 12C:
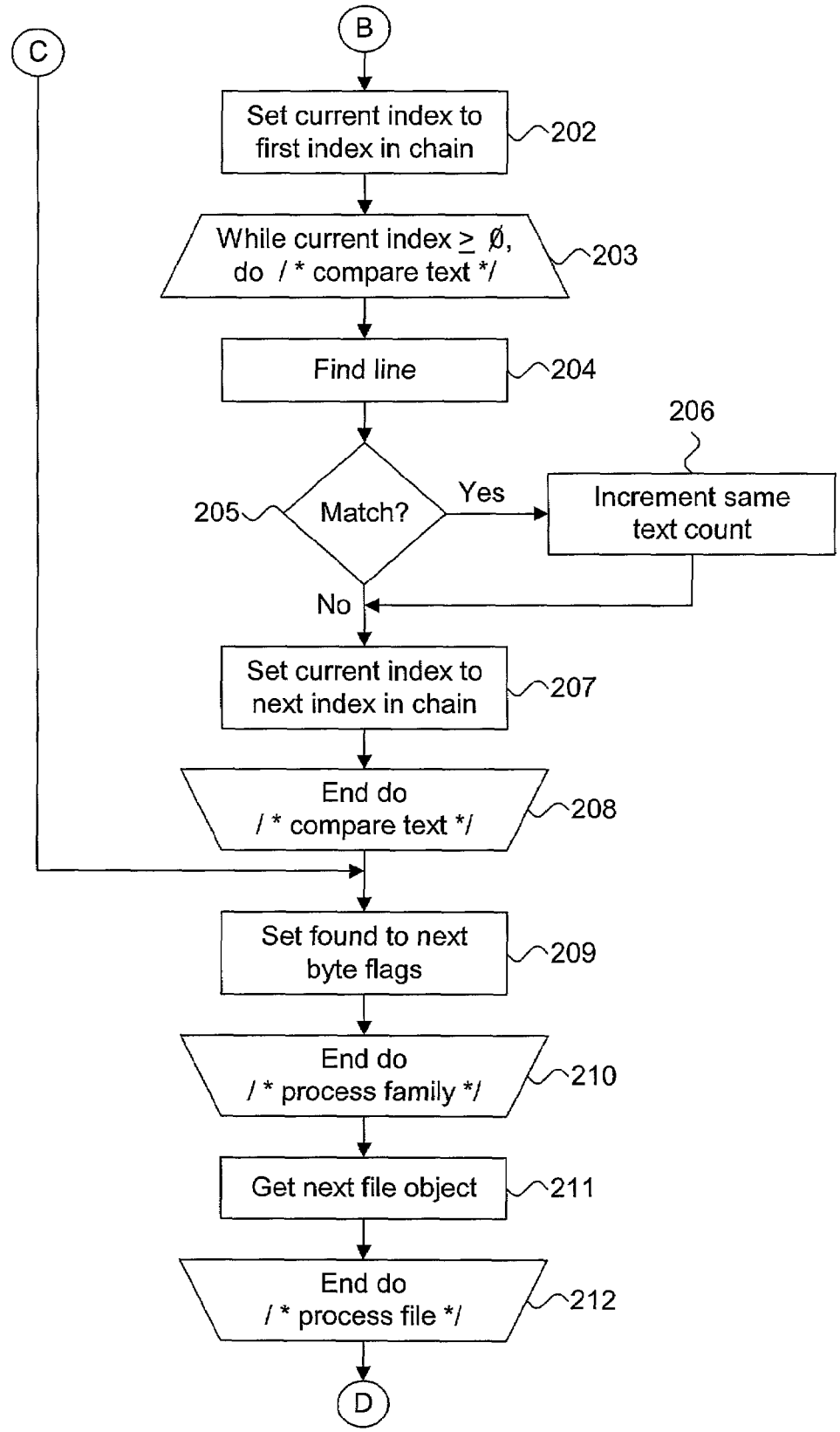
Figure 12D:
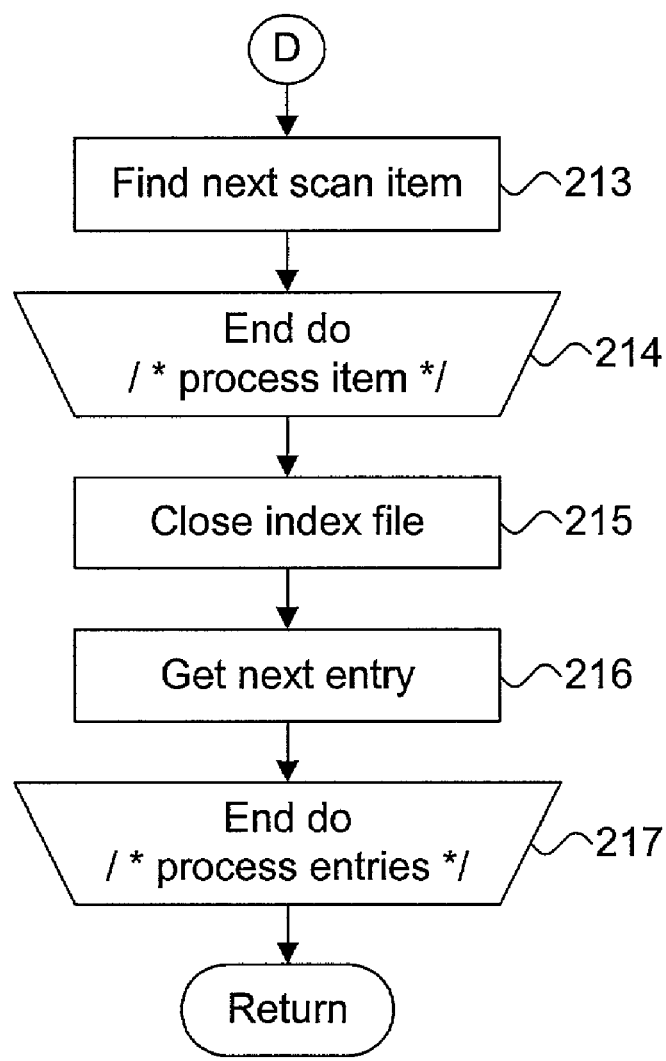

FIGS. 11A–11C are flow diagrams of the routine for updating the macro virus definitions database 28 (shown in FIG. 3) for use in the method of FIG. 8. The purpose of this routine is to update and index any new macro virus definitions into the macro virus definitions database 28.

First, the log file 34 (shown in FIG. 3) is set (block 151). Each entry in the macro virus definitions database 28 is iteratively processed as follows. First, the first entry in the database 28 is obtained (block 152) and iteratively processed (blocks 153–174) as follows. The index file 41 (shown in FIG. 4) is reset (block 154) and the first item to scan is found (block 155) and iteratively processed (blocks 156–171) as follows. The parser 20 (shown in FIG. 3) is initialized (block 157) and the scan item, that is, macro virus file, is parsed (block 158) to generate a parse tree 70 (shown in FIG. 7). The item header that is storing the parse information 50 (shown in FIG. 5) is stored (block 159). Each of the chains of nodes storing string constants and source code text are processed (blocks 160–164 and 165–169, respectively). The string constants are processed first by setting the current index to the first index in the chain of string constants 72 (shown in FIG. 7) (block 160). Each of the indexes is iteratively processed (block 161–169) as follows. Each string constant Strings (shown in FIG. 5) is stored using the current index as an index into the Strings array (block 162). The current index is then set to the next index in the chain of strings 72 (block 163). Next, each of the source code text segments is processed by setting the current index to the first index in the chain of source code text segments 74 (shown in FIG. 7) (block 165). The source code text segments 74 are iteratively processed (blocks 166–169), as follows. Each source code text segment is stored in the Lines array indexed by the current index (block 167). The current index is then set to the next index in the chain of source code text segments 74 (block 168).

After all of the string constants and source code text segments are processed (blocks 160–164 and 165–169, respectively), the next scan item, that is, macro virus file, is obtained (block 170) and iteratively processed (blocks 156–171), as follows. Next, the index file 41 (shown in FIG. 4) is closed (block 172) and the next entry in the database 28 is obtained (block 173). Processing of database entries continues (blocks 153–174) until the database 28 is complete, after which the routine returns.

FIGS. 12A–12D are flow diagrams showing the routine for checking the macro virus definitions database 28 (shown in FIG. 3) for use in the method of FIG. 8. The purpose of this routine is to check for cross references in the macro virus definition database 28.

Each of the entries in the database 28 are iteratively processed (blocks 182–217) after first obtaining the first entry in the database 28 (block 181). The index file 41 (shown in FIG. 4) for the current database entry is opened (block 183). Each of the scan items, that is, macro virus definitions, is iteratively processed (blocks 185–214) after first selecting the first scan item (block 184). Similarly, each file object, that is, macro virus file, is iteratively processed (blocks 187–212) after first selecting a first file object (block 186).

During the processing of each file object, the parser 20 (shown in FIG. 3) is initialized (block 188) and the file object is parsed (189) to generate a parse tree 70 (shown in FIG. 7).

Next, each of the macro virus families, as characterized by their respective methods of replication, is processed as follows. The types of replication methods are indicated in the byte flag ReplFlags (shown in FIG. 5). Each of the macro virus definition families is iteratively processed (blocks 191–21) after first selecting the first byte flag ReplFlags (block 190). If the current file object is in the same macro virus replication family (block 192), the family is skipped. Otherwise, the .dat file 42 (shown in FIG. 4) is processed as follows.

For each .dat file 42, the string constants and source code text segments are processed (blocks 194–200 and 202–208, respectively). First, the current .dat file is opened (block 193). Next, the current index is set to the first index in the chain of string constants (block 194) and iterative processing (block 195) begins. The strong is compared to the string constants for the current macro virus definition (block 196), and if the string matches (block 197), the same string counter is incremented (block 198). The current index is set to the next index in the chain of string constants 72 (block 199) and iterative processing continues (block 195) until the chain of string constants is complete. Next, if the detection level for text is greater than zero (block 201), source code text segments are processed as follows. First, the current index is set to the first index in the chin of source code text segments 74 (shown in FIG. 7). Iterative processing then begins (block 203). The string is compared to the source code text segments stored in the current macro virus definition (block 204), and if a match is found (block 205), the same text counter is incremented (block 206). The index is set to the next index in the chain of source code text 74 (block 207). Iterative processing continues (block 204) until the chain of source code segments 74 is complete.

The string constants and source code text having been processed, the next macro virus family is selected by setting the found flag to the next byte flag ReplFlags (block 209) and the macro virus definition families are iteratively processed (block 191) until the families are complete.

Similarly, the next file object is selected (block 211) and the file objects are iteratively processed (block 187) until all the file objects are complete. Next, the next scan item, that is, .dat file 43 (shown in FIG. 4) (block 213) for each of the scan items is iteratively processed (block 185) until the scan items are complete. Finally, the index file 41 (shown in FIG. 4) is closed (block 215) and the next entry in the macro virus definitions database 28 (shown n FIG. 3) is selected (block 216). Each of the macro virus definition database 28 entries is iteratively processed (block 182) until the database entries are complete, after which the routine returns.

Figure 13A:
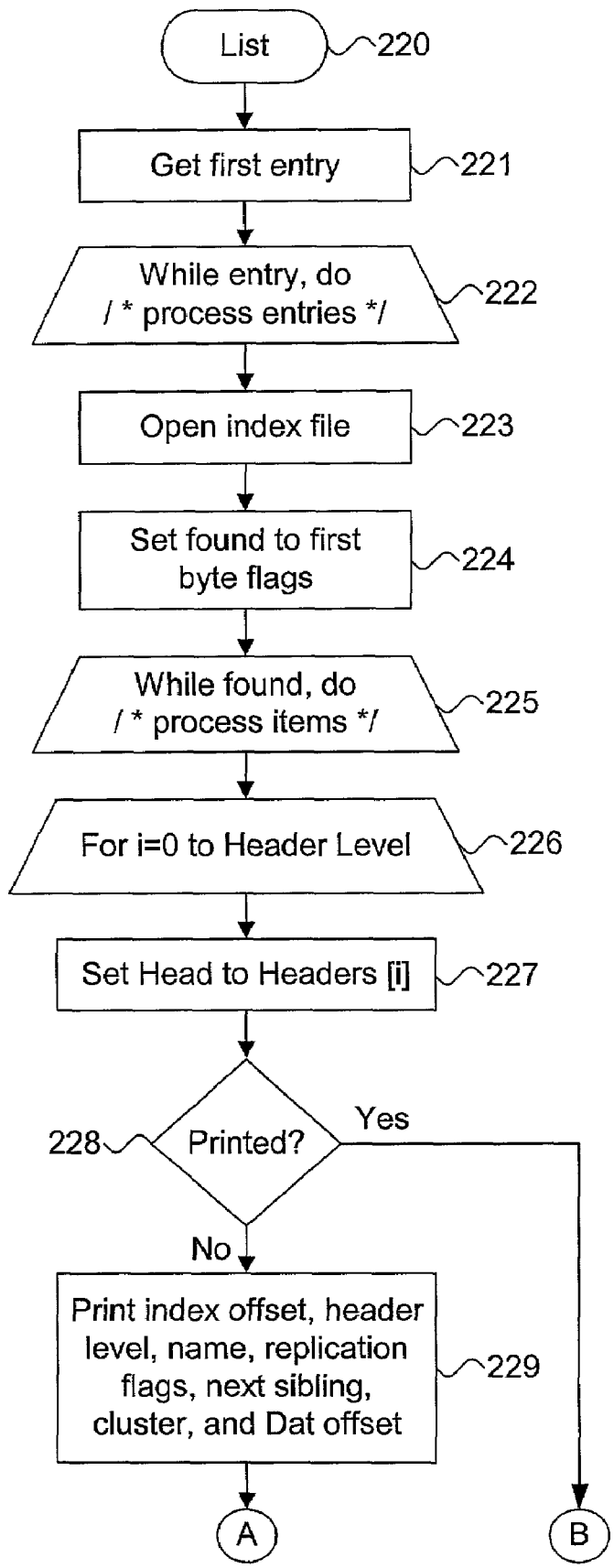
FIGS. 13A–13B are flow diagrams showing the routine for listing the macro virus definitions.
Figure 13B:
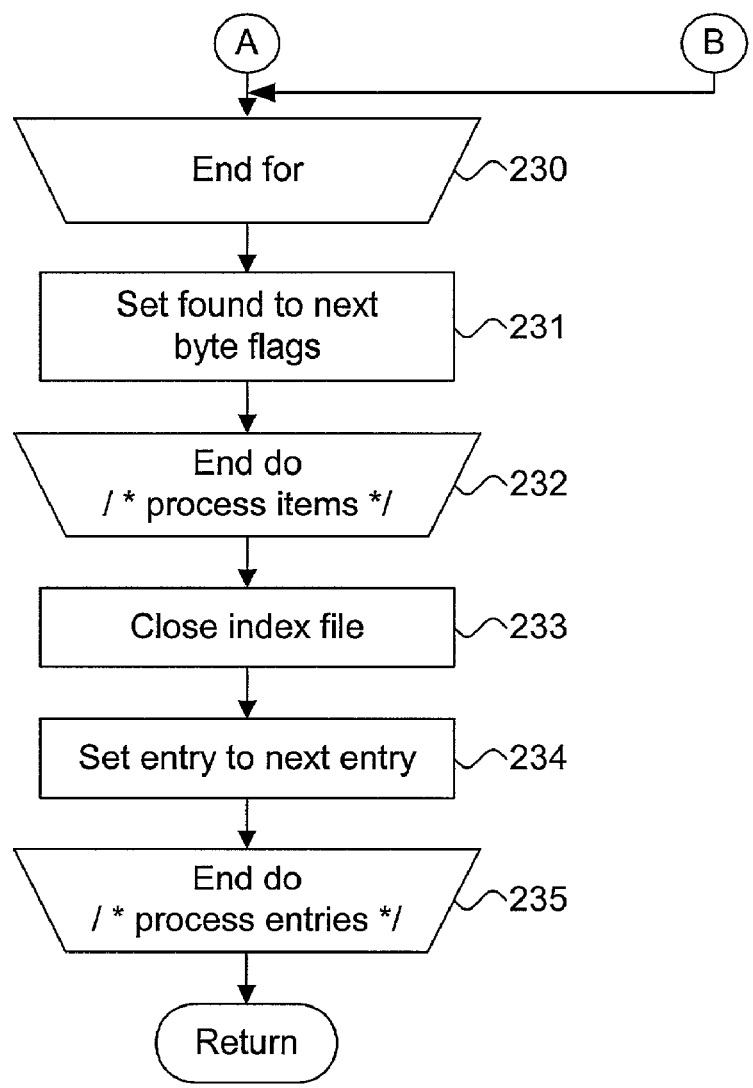

FIGS. 13A–13B are flow diagrams showing the routine for listing the macro virus definition families in the database 28 (shown in FIG. 3) for use in the method of FIG. 8. The purpose of this routine is to iteratively list the macro virus families.

Each of the entries in the database 28 is iteratively processed (blocks 222–235) by first selecting the first entry in the database 28 (block 221). The index file 41 (shown in FIG. 4) is open (block 223). A found flag is set to the first byte flags replFlag (shown in FIG. 5) (block 224) to indicate the current macro virus definition family. Recall that the macro virus definition families are identified by replication method. Iterative processing begins (block 225) by walking through the parse information headers 50 (shown in FIG. 5) (blocks 226–230), as follows. First, a head pointer is set to the current headers (block 227) and, if the header has not been printed (block 228), the index offset, header level, name, replication flags, next sibling, cluster and .dat offset are printed (block 229). Upon completion of the printing of each of the headers (blocks 226–230), the next macro virus family is selected by setting the found flag to the next byte flags replFlag (block 230). Iterative processing continues with the next macro family (block 225) after which the index file 41 is closed (block 233) and the next entry in the database 28 is selected (block 234). Iterative processing of database entries continues (block 222) until all of the database entries are complete, after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for identifying a macro virus family using a macro virus definitions database, comprising:

a macro virus definitions database comprising a set of indices and macro virus definition data files with each index referencing one or more of the macro virus definition data files and each macro virus definition data file defining macro virus attributes for known macro viruses that are each comprised of at least one macro, the sets of the indices and the macro virus definition data files being organized into a hierarchy according to macro virus families based on a type of application to which the macro applies;

a parser parsing a suspect file into tokens comprising one of individual string constants and source code text and storing the tokens as suspect strings into a hierarchical parse tree;

a macro virus checker comparing each suspect string to the macro virus attributes defined in the one or more macro virus definition data files for each macro virus family in the macro virus definitions database and determining each macro virus family to which the suspect string belongs from the index for each macro virus definition data file at least partially containing the suspect string;

the macro virus checker parsing the macro virus attributes from one or more file objects and analyzing the macro virus definition data files by index for each macro virus family; and the macro virus checker iteratively retrieving each macro virus definition data file using the index for each macro virus family and providing the macro virus attributes defined in the retrieved macro virus definition data file;

wherein the macro virus definitions database stores at least one of string constants and source code text common to each macro virus family in the macro virus attributes for the macro virus definition data files; and the macro virus checker compares each suspect string to the at least one of string constants and source code text in the one or more macro virus definition data files for each macro virus family;

wherein a parameter is utilized for specifying a threshold to matches of commonly shared at least one of string constants and source code text;

wherein the macro virus definition data files are indexed into the macro virus families categorized by a replication method employed;

wherein the suspect string comprises part of the suspect file, the suspect file comprising a plurality of individual suspect strings;

wherein the macro virus checker identifies the replication method common to the plurality of the individual suspect strings in the suspect file;

wherein the macro virus checker identifies the macro virus family by which the common replication method is indexed.

2. A system according to claim 1, further comprising:

the macro virus checker resetting the index referencing one or more of the macro virus definition data files for at least one macro virus family and creating a new macro virus definition data file entry comprising an index referencing one or more macro virus definition files.

3. A system according to claim 2, further comprising:
the new macro virus definition data file entry defining the macro virus attributes by storing at least one of a string constant and source code text.

4. A system according to claim 1, further comprising:
the macro virus checker cross referencing at least one of a string constant and source code text from the parsed macro file attributes against the macro virus attributes defined in the virus definition data files.

5. A method for identifying a macro virus family using a macro virus definitions database, comprising:
maintaining a macro virus definitions database comprising a set of indices and macro virus definition data files with each index referencing one or more of the macro virus definition data files and each macro virus definition data file defining macro virus attributes for known macro viruses that are each comprised of at least one macro;
organizing the sets of the indices and the macro virus definition data files into a hierarchy according to macro virus families based on a type of application to which the macro applies;
parsing a suspect file into tokens comprising one of individual string constants and source code text and storing the tokens as suspect strings into a hierarchical parse tree;
comparing each suspect string to the macro virus attributes defined in the one or more macro virus definition data files for each macro virus family in the macro virus definitions database; and
determining each macro virus family to which the suspect string belongs from the index for each macro virus definition data file at least partially containing the suspect string;
parsing the macro virus attributes from one or more file objects and analyzing the macro virus definition data files by index for each macro virus family; and
iteratively retrieving each macro virus definition data file using the index for each macro virus family and providing the macro virus attributes defined in the retrieved macro virus definition data file;
wherein the macro virus definitions database stores at least one of string constants and source code text common to each macro virus family in the macro virus attributes for the macro virus definition data files; and
a comparison is performed between each suspect string and the at least one of string constants and source code text in the one or more macro virus definition data files for each macro virus family;
wherein a parameter is utilized for specifying a threshold to matches of commonly shared at least one of string constants and source code text;
wherein the macro virus definition data files are indexed into the macro virus families categorized by a replication method employed;
wherein the suspect string comprises part of the suspect file, the suspect file comprising a plurality of individual suspect strings;
wherein the replication method common to the plurality of the individual suspect strings in the suspect file is identified;

wherein further included is an identification of the macro virus family by which the common replication method is indexed.

6. A method according to claim 5, further comprising:
resetting the index referencing one or more of the macro virus definition data files for at least one macro virus family; and
creating a new macro virus definition data file entry comprising an index referencing one or more macro virus definition files.

7. A method according to claim 6, further comprising:
defining the macro virus attributes for the new macro virus definition data file entry by storing at least one of a string constant and source code text.

8. A method according to claim 5, further comprising:
cross referencing at least one of a string constant and source code text from the parsed macro file attributes against the macro virus attributes defined in the virus definition data files.

9. A computer-readable storage medium holding code for performing the method according to claims 5, or 6.

10. A system for identifying a macro virus family using a macro virus definitions database, comprising:
a macro virus definitions database comprising a set of indices and associated macro virus definition data files, further comprising:
one or more of the macro virus definition data files referenced by the associated index with each macro virus definition data file defining macro virus attributes for known macro viruses that are each comprised of at least one macro;
a hierarchy organized according to a macro family to which each of the sets of the indices and the macro virus definition data files belong based on a type of application to which the macro applies;
a parser parsing a suspect file into tokens comprising one of individual string constants and source code text and storing the tokens as strings into a hierarchical parse tree;
a macro virus checker comparing one or more strings stored in a suspect file to the macro virus attributes defined in the one or more macro virus definition data files for each macro virus family in the macro virus definitions database and determining the macro virus family to which the suspect file belongs from the indices for each of the macro virus definition data files at least partially containing the suspect file;
the macro virus checker parsing macro virus attributes from one or more file objects and analyzing the macro virus definition data files by index for each macro virus family; and
the macro virus checker iteratively retrieving each macro virus definition data file using the index for each macro virus family and providing the macro virus attributes defined in the retrieved macro virus definition data file;
wherein the macro virus definitions database stores at least one of string constants and source code text common to each macro virus family in the macro virus attributes for the macro virus definition data files; and
the macro virus checker compares a suspect string to the at least one of string constants and source code text in the one or more macro virus definition data files for each macro virus family;
wherein a parameter is utilized for specifying a threshold to matches of commonly shared at least one of string constants and source code text;

wherein the macro virus definition data files are indexed into the macro virus families categorized by a replication method employed;

wherein the suspect string comprises part of the suspect file, the suspect file comprising a plurality of individual suspect strings;

wherein the macro virus checker identifies the replication method common to the plurality of the individual suspect strings in the suspect file;

wherein the macro virus checker identifies the macro virus family by which the common replication method is indexed.

11. A system according to claim 10, further comprising:
each macro virus family defined according to the replication method common to each of the macro virus definition data files associated with one such index.

12. A system according to claim 10, further comprising:
the macro virus checker designating a minimum length of commonly shared string constants.

13. A method for identifying a macro virus family using a macro virus definitions database, comprising:

maintaining a macro virus definitions database comprising a set of indices and associated macro virus definition data files, further comprising:

referencing one or more of the macro virus definition data files by the associated index with each macro virus definition data file defining macro virus attributes for known macro viruses that are each comprised of at least one macro;

organizing the sets of the indices and the macro virus definition data files into a hierarchy according to macro virus families based on a type of application to which the macro applies;

parsing a suspect file into tokens comprising one of individual string constants and source code text and storing the tokens as strings into a hierarchical parse tree;

comparing the strings to the macro virus attributes defined in the one or more macro virus definition data files for each macro virus family in the macro virus definitions database;

determining the macro virus family to which the suspect file belongs from the indices for each of the macro virus definition data files at least partially containing the suspect file;

parsing macro virus attributes from one or more file objects and analyzing the macro virus definition data files by index for each macro virus family; and iteratively retrieving each macro virus definition data file using the index for each macro virus family and providing the macro virus attributes defined in the retrieved macro virus definition data file;

wherein the macro virus definitions database stores at least one of string constants and source code text common to each macro virus family in the macro virus attributes for the macro virus definition data files; and a comparison is performed between a suspect string and the at least one of string constants and source code text in the one or more macro virus definition data files for each macro virus family;

wherein a parameter is utilized for specifying a threshold to matches of commonly shared at least one of string constants and source code text;

wherein the macro virus definition data files are indexed into the macro virus families categorized by a replication method employed;

wherein the suspect string comprises part of the suspect file, the suspect file comprising a plurality of individual suspect strings;

wherein the replication method common to the plurality of the individual suspect strings in the suspect file is identified;

wherein further included is an identification of the macro virus family by which the common replication method is indexed.

14. A method according to claim 13, further comprising:
defining each macro virus family according to the replication method common to each of the macro virus definition data files associated with one such index.

15. A method according to claim 13, further comprising: designating a minimum length of commonly shared string constants.

16. A computer-readable storage medium holding code for performing the method according to claims 13, or 14.

* * * * *